(12) United States Patent
Tanaka

(10) Patent No.: US 6,944,682 B2
(45) Date of Patent: Sep. 13, 2005

(54) SYSTEM AND METHOD FOR DIRECTLY INDICATING TO FIRST DIRECT MEMORY CONTROLLER (DMA) IN HALT STATE TO RESUME DMA TRANSFER VIA RESUME INSTRUCTION FROM SECOND DMA CONTROLLER

(75) Inventor: Tomonori Tanaka, Kanagawa (JP)

(73) Assignee: Ricoh Co., Ltd., Tokyo (JP)

( * ) Notice: Subject to any disclaimer, the term of this patent is extended or adjusted under 35 U.S.C. 154(b) by 47 days.

(21) Appl. No.: 10/393,495

(22) Filed: Mar. 20, 2003

(65) Prior Publication Data

US 2004/0015621 A1 Jan. 22, 2004

(30) Foreign Application Priority Data

Mar. 22, 2002 (JP) .......................... 2002-081971

(51) Int. Cl.[7] .............................................. G06F 13/28
(52) U.S. Cl. ........................... 710/22; 710/20; 710/21; 710/24; 710/26; 710/56; 358/1.14; 358/1.17; 358/437

(58) Field of Search ................................ 710/20–22, 24, 710/56, 26; 358/1.14, 1.17, 437

(56) References Cited

U.S. PATENT DOCUMENTS

| | | | | |
|---|---|---|---|---|
| 5,412,488 A | * | 5/1995 | Ogata | 358/437 |
| 5,696,989 A | * | 12/1997 | Miura et al. | 710/24 |
| 5,717,952 A | * | 2/1998 | Christiansen et al. | 710/22 |
| 5,928,339 A | * | 7/1999 | Nishikawa | 710/26 |
| 6,012,109 A | * | 1/2000 | Schultz | 710/56 |
| 6,412,027 B1 | * | 6/2002 | Amrany et al. | 710/22 |
| 6,456,390 B1 | * | 9/2002 | Okubo et al. | 358/1.17 |

* cited by examiner

Primary Examiner—Tammara Peyton
(74) Attorney, Agent, or Firm—Knoble Yoshida & Dunleavy LLC (57) ABSTRACT

Direct memory access (DMA) controllers are used in digital processing of image data in image processing devices such as digital copiers, scanners, printers and fax machines. The DMA controllers are controlled for memory access by a predetermined resume signal that is sent from one DMA controller to another.

5 Claims, 6 Drawing Sheets

SYSTEM AND METHOD FOR DIRECTLY INDICATING TO FIRST DIRECT MEMORY CONTROLLER (DMA) IN HALT STATE TO RESUME DMA TRANSFER VIA RESUME INSTRUCTION FROM SECOND DMA CONTROLLER

FIELD OF THE INVENTION

The current invention is generally related to a direct memory access (DMA) controller, and more particularly related to a memory use technology for the DMA in digital processing image information in image processing devices such as digital copiers, scanners, printers and fax machines.

BACKGROUND OF THE INVENTION

One common image reproduction method in image processing devices such as digital copiers, scanners, printers and fax machines is as follows: The image data received from a host is put in a bit-mapped image based upon a block unit as a division unit according to a print language. Subsequently, to save memory space, the image data is temporarily compressed and is stored in a memory device. When the image data is to be printed, one page of the image data is prepared in the compressed state, and the decompressed is outputted via the DMA for each band. The DMA output is performed by a DMA controller. For example, Japanese Patent Nos. 2603123 and 2515367 disclose the DMA controllers.

For the image processing at an image processing device, there is no problem if the memory capacity is sufficient and one page of the image data is copied in the image memory. However, when the image memory capacity is smaller than one page of the image data, a control process by the DMA controller becomes necessary. In this case, the prior art technology uses two memory areas for one band of image data. One memory area is used for the decompressed image data for memory write while the other one is for the output of the image data for memory read. The two areas in the limited memory space are toggled. To practice the above described toggling, two DMA controllers are used, and their roles are divided. One DMA controller performs the operation of the decompressed image data while the other DMA controller performs the read operation of the image data in the memory. Furthermore, the DMA controllers register the descriptor information in their register, and the direct access memory operation is performed according to the descriptor information. For example, the descriptor information includes a chain address to indicate a storage address for a next descriptor and a data transfer-address indicative of a beginning address of the next data transfer destination.

In order for the two DMA controllers to efficiently toggle for processing to the image memory, it is necessary to control the activation or the chain operation of the DMA controllers based upon the band unit of the image data. In the conventional technology, the above described control is performed by the software installed in the image processing device. If the two DMA controllers are toggled by the software and the printing speed of the image forming unit is relatively slow, there is no substantial problem. However, as the printing speed of the image forming unit becomes faster, it is more difficult for the software to interrupt for the toggling operation. In other words, when the image forming unit is at a high printing speed, since the toggling by the DMA controllers between the decompressed image data for memory write and the output of the image data for memory read must be also at a high speed, the information processing speed by the toggling software in the image processing device may not keep up with the above high speed. As a result, the overall performance undesirably deteriorates. It is also undesirable that the software itself is overly complex.

For the above described reasons, it remains desirable to improve the image processing performance in forming images using the memory capacity of a less than one page of image data and by toggling between the two DMA transferring processes.

SUMMARY OF THE INVENTION

In order to solve the above and other problems, according to a first aspect of the current invention, a direct memory access (DMA) controller system for processing image data, including an external memory having a descriptor area for storing descriptor information; an image memory to store the image data having at least two areas, a first DMA controller connected to the external memory and the image memory for reading first descriptor information and for transferring blocks of the image data via DMA transfer alternately to one of the at least two areas of the image memory for processing according to the first descriptor information, the first descriptor information including a pause bit indicative of a halt state for the first DMA controller to temporarily halt the DMA transfer after the first DMA controller writes the block of the image data in one of the at least two areas; and a second DMA controller connected to the external memory and the image memory for reading second descriptor information and for transferring to a predetermined outside unit the blocks of the processed image data that the first DMA controller had already transferred in at least the two areas of the image memory according to the second descriptor information concurrently with the first DMA controller transferring other blocks of the image data in the image memory, the second DMA controller directly indicating to the first DMA controller in the halt state to resume the DMA transfer via a resume instruction.

According to a second aspect of the current invention, a method of controlling a plurality of direct memory access controllers, including the steps of: reading first descriptor information including a pause bit indicative of a halt state at a first DMA controller; writing blocks of the image data via DMA transfer by the first DMA controller alternately to one of at least two areas of image memory according to the first descriptor information; temporarily halting the DMA transfer of the first DMA controller based upon the pause bit after the first DMA controller writes the block of the image data in one of the at least two areas; reading second descriptor information at a second DMA controller; concurrently transferring by the second DMA controller to a predetermined outside unit the blocks of the processed image data that the first DMA controller had already written in at least the two areas of the image memory according to the second descriptor information while the first DMA controller writes other blocks of the image data in the image memory; and directly indicating to the first DMA controller in the halt state to resume the DMA transfer via a resume instruction in a resume bit in the second description information from the second DMA controller.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Based upon incorporation by external reference, the current application incorporates all disclosures in the corresponding foreign priority document from which the current application claims priority.

Figure 1:
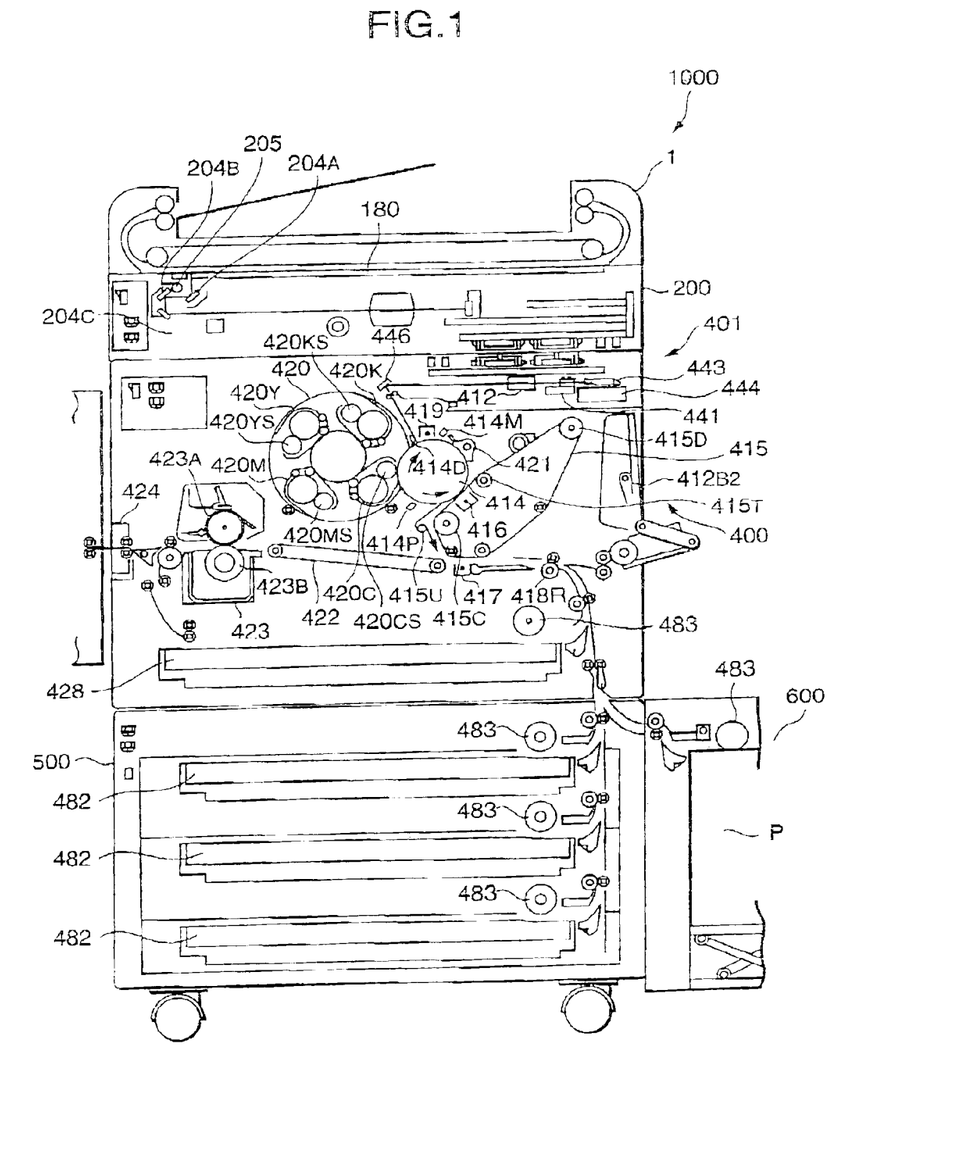
FIG. 1 is a diagram illustrating a digital multifunctional copier that contains one preferred embodiment of the direct memory access (DMA) controller according to the current invention.

Referring now to the drawings, wherein like reference numerals designate corresponding structures throughout the views, and referring in particular to FIG. 1, a diagram illustrates a digital multifunctional copier that contains one preferred embodiment of the direct memory access (DMA) controller according to the current invention. The digital multifunctional copier 1000 includes a scanner unit 200 with an automatic document feeder ADF1, an intermediate transfer belt 415 for forming an image in black (Bk), cyan (C), magenta (M) and yellow (Y) in a multi-layer, an image forming unit 400 for transferring the image onto a transfer sheet P, a supply tray 500 or a large-capacity supply storage 600. The scanner unit 200 receives a scanner start signal for scanning a document on a glass 180 by coordinating the activation of a lamp-mirror optical unit including a light source 205 and using mirrors 205A, 205B and 205C in the digital multifunctional copier 1000. For each scanning run, one color data of the image is obtained. For each scanning, the scanned image data is sequentially used to form an image by the image forming unit 400, and the images are overlapped in a layer on the intermediate transfer belt 415 to generate a four full color image.

Still referring to FIG. 1, the image forming unit 400 further includes an optical writing unit 401. The optical writing unit 401 converts the color image data from the scanner unit 200 to an optical signal and performs an optical write process according to the original image to form a static image on a photosensitive drum 414. The optical writing unit 401 also further includes a laser emitting unit 441 with an emitting control unit, a polygon mirror 443, a motor 444 for rotating the polygon mirror 443, an fθ lens 442 and a reflection mirror 446. The photosensitive drum 414 rotates in a counter clockwise direction around the photosensitive drum 414, there are the following components including a photosensitive drum cleaning unit 421, a discharging lamp 414M, a charging unit 419, a voltage sensor 414D for detecting the surface static voltage on photosensitive drum 414, a selected one of revolver-type developing unit 420, a developer concentration and pattern detection unit 414P and the intermediate transfer belt 415. The revolver-type developing unit 420 further includes a Bk developer 420K, a C developer 420C, a M developer 420M, a Y developer 420Y and a revolver rotating unit for rotating the Bk developer 420K, the C developer 420C, the M developer 420M and the Y developer 420Y in a counter clock direction. The revolver rotating unit is not shown in FIG. 1. The Bk developer 420K, the C developer 420C, the M developer 420M and the Y developer 420Y respectively further include a rotatable developer sleeves 42DKS, 420CS, 42DMS and 42DYS to form an image based upon the static image by contacting a toner holding portion on the surface of the photosensitive drum 414. The developers 420K, 420C, 420M and 420Y respectively further each include a rotatable toner paddle for agitating and transferring the toner, and the rotatable toner paddle is not shown in FIG. 1.

At a waiting position, the revolver-type developing unit 420 is rotated to select the Bk developer 420K to perform black (Bk) development. When a copy operation is initiated, the scanner 200 starts scanning the Bk image data at a predetermined timing, and the optical writing unit 401 initiates the laser writing and the image formation based upon the scanned image. Herein after, a static image by the Bk image data is designated as a Bk static image. A corresponding designation is similarly used for the for the C, M and Y images. Before the front portion of the Bk static image arrives at a predetermined developing position of the Bk developer 420K, the rotation of the developer sleeve 420KS is initiated, and the Bk static image is developed by the Bk toner. Subsequently, although the developing operation continues, at the point when an end portion passes the Bk static image, the developing unit 420 is swiftly put into rotation from the developing position for the Bk developer 420K to a next developing position for a next selected developer. The above rotation is completed at least before the front portion of the next static image arrives. As the next image forming cycle starts, the photosensitive drum 414 rotates in a counter-clock wise direction, and the intermediate transfer bell 415 is rotated by a motor in a clockwise direction. As intermediate transfer belt 415 is rotated, a toner image is formed by the subsequent order of the Bk toner, the C toner, the M toner and the Y toner, and the image is finally formed on the intermediate transfer belt 415 in the order of Bk, C, M and Y.

For example, the Bk image is formed by the following manner. The photosensitive drum 414 is uniformly charged via corona discharge to about −700 V by negative voltage. Subsequently, the laser emitting unit 441 exposes the surface of the photosensitive drum 414 by rastering according to the Bk signal. When a rastering image is exposed in the above manner, a static image is formed by removing the charge in proportion to the exposure amount in the exposed area on the uniformly charged surface of the photosensitive drum 414. The toner in the revolver-type developing unit 420 is negatively charged by agitating with ferrite carriers, and the rotatable Bk developer sleeves 420KS is biased at a voltage level by the negative direct current superimposed by alternating current by a circuit for a basic metal layer in the photosensitive drum 414. As a result, the Bk toner does not attach to an area with residual charge on the photosensitive drum 414 while the Bk toner does attach to an exposed or discharged area. Thus, a Bk visual image is formed and approximates the static image.

The intermediate transfer belt 415 is supported by a operating roller 415D, a transfer roller 415T, a cleaning roller 415C and a group of passively rotating rollers. The rollers 415C, 415D and 415T are driven by a motor. The Bk image formed on the photosensitive drum 414 is transferred by a transferring unit 416 via belt transferring corona discharge onto the surface of the intermediate transfer belt 415 that is contacting the photosensitive drum 414 and is moving at the same rotating speed of the photosensitive drum 414. In the above described manner, the toner image transfer or belt transfer is performed from the photosensitive drum 414 to the intermediate transfer belt 415. The residual toner on the photosensitive drum 414 after transfer is cleaned by the cleaning unit 421 for the next use of the photosensitive drum 414. The above collected toner is stored in a waste toner tank via a collection pipe. On the intermediate transfer belt 415, a four-color toner transfer belt image is formed by sequentially layering on the same surface and at the same coordinates the Bk, C, M and Y toner images that are formed on the photosensitive drum 414. Subsequently, the four-color toner transfer belt image is transferred onto an image carrying medium or paper by a paper transferring unit 417 via paper transfer corona discharge.

After the Bk image formation step, the photosensitive drum 414 will next have the C image formation. From a predetermined timing, the scanner unit 200 starts reading the C image data and simultaneously forms a static C image by the laser from the optical writing unit 401. After the Bk static image end portion passes but before the C static image front portion arrives at the developing position, the C developer 420C is rotated to the developing position and develops the C static image by the C toner. Subsequently, the C static image area is continuously being developed. When the C static image end portion passes the developing position, the C developer 420C is rotated out from the developing position as in the case of the Bk developer 420Bk by activating the developing unit 420, and the M developer 420M is rotated into the developing position. Similarly, the above rotation is performed before the M static image front portion arrives at the developing position. For the image formation of the M and Y image, since the corresponding image data is each read in, and the above described static image forming and developing processes are performed, the further description is not repeated.

Still referring to FIG. 1, a cleaning unit 415U further includes an input seal, a rubber blade, an outputting coil and the associated separation mechanism. The above components are not shown in FIG. 1. After the first color BK image is transferred onto intermediate transfer belt 415, while the second, third and fourth color images are being transferred to the intermediate transfer belt 415, the input seal and the rubber blade are separated from the surface of the intermediate transfer belt 415 by the separation mechanism. The paper transferring unit 417 transfers the layered toner image on the intermediate transfer belt 415 onto an image carrying medium such as a transfer paper sheet by the corona discharge method in which a combination of AC and DC or DC is charged on the intermediate transfer belt 415 or the transfer paper sheet. The image forming unit 400 and a paper supply cassette 482 of the supply tray 500 or the large-capacity supply storage 600 store various sizes of the transfer paper P. At the image formation, a selected size of the paper is supplied and transferred from the corresponding paper supply cassette 482 or the large-capacity supply storage 600 by a corresponding one of supply rollers 483 in a direction as indicated by an arrow near a register roller 418R. A tray 412B2 manually feeds over-head projector sheets or thick paper. As the image formation starts, the transfer sheet P is supplied from the paper supply cassette 482, the large-capacity supply storage 600 or the tray 412B2 and is waiting at a nip position of the register roller 418R. When the front portion of the toner image on the intermediate transfer belt 415 reaches the paper transferring unit 417, the register roller 418R is activated to physically match the toner image front portion with the front portion of the transfer paper P without a margin area. In the above manner, the transfer paper P is placed over the color-layered image on the intermediate transfer belt 415 and passes the positively charging paper transferring unit 417. By the corona discharge, the transfer paper P is positively charged, and almost all of the toner is transferred substantially transferred onto the transfer paper P.

A removal brush on the left of the paper transferring unit 417 is a removal or discharging device. When the transfer paper P passes the removal brush, the transfer paper P is discharged and is disassociated from the intermediate transfer belt 415 onto a paper transfer belt 422. The transfer paper P now has a simultaneously transferred 4-color layered image from the intermediate transfer belt 415 and is transferred to a fuser or fixer 423 by the paper transfer belt 422. The fuser 423 further includes a fuser roller 423A that is kept at a predetermined temperature and a pressure roller 423B for fusing the toner image. Finally, an output roller 424 outputs the transfer paper P to the outside of the main body and places it with the image side on top on a copy tray. After the belt transfer, the surface of the photosensitive drum 414 is cleaned by the brush roller and a rubber blade of the cleaning unit 421 and is further uniformly discharged by the discharging lamp 414M. After the toner image is transferred to the transfer paper P, the surface of the intermediate transfer belt 415 is again cleaned by a blade of the cleaning unit 415U that is made contact by the blade moving mechanism. When the copy is repeated, the operation of the scanner unit 200 and the image formation by the photosensitive drum 414 resume for a first color of a second pare at a predetermined time after the fourth color of the first page is completed. After the simultaneous transfer of the 4-color layered image of a first page onto transfer paper, the surface of the intermediate transfer belt 415 is cleaned by the cleaning unit 415U, and the Bk toner image of a second page is belt transferred onto the cleaned area on the intermediate transfer belt 415. The second page is subsequently processed as described with respect to the first page.

Figure 2:
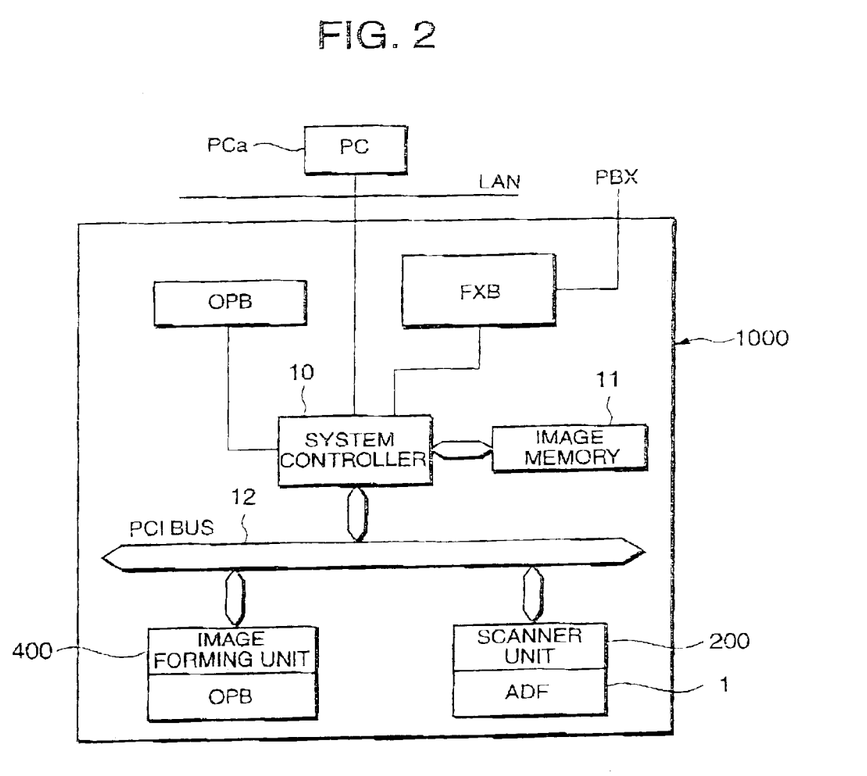
FIG. 2 is a block diagram illustrating electrical or hardware components in a preferred embodiment of the digital color copier according to the current invention.

Now referring to FIG. 2, a block diagram illustrates electrical or hardware components in a preferred embodiment of the digital color copier according to the current invention. The digital color copier 1000 includes a system controller 10 for controlling the whole system of the digital copier 1000. The system controller 10 is connected to an operation board OPB, which provides a display function to an operator, a function setting function and an information input function. In addition to the general copy process control, the system controller 10 also performs a print control. The print control includes the receipt of a print command and print data from an external device such as a personal computer (PC) PCa, an analysis of the received print commands, the generation of bit maps for printing the image data and the operation of an image forming unit 400 of the digital copier 1000 for printing out the image data. Furthermore, since the system control 10 receives the image data and the commands via local area network (LAN) and a parallel interface (I/F), the system controller 10 includes the LAN and the parallel I/F. A facsimile board FXB initiates the scanner unit 200 to read an original document via the system controller 10 in response to a facsimile transmission command. The facsimile board FXB transmits the scanned image data to a facsimile line via private branch exchange (PBX). In reverse, the facsimile board FXB receives the image data from the communication line in response to a facsimile call and operates the color digital copier 1000 to print out the received image data.

Still referring to FIG. 2, the scanner unit 200 and the image forming unit 400 communicate with each other via a peripheral component interconnect (PCI) bus. After the scanner unit 200 corrects the signal degradation in the scanned image data that is associated with digitization and is caused by the optical system, the corrected image data is sent to the image forming unit 400 or is written in a image memory 11, which is connected to the system controller 10. That is, the scanner unit 200 is capable of both performing a first job of storing the scanned image data in the image memory 11 and reusing it and a second job of outputting the scanned image data to the image forming unit 400 without storing it at the image memory 11. One example for storing the image data at the image memory 11 is to copy a single original document for a number of times by scanning the original document once by the scanner 200, storing the scanned image data at the image memory 11 and reading the stored image data for a number of times. When the scanned image data is intended for keeping for a relatively long time, it is useful to write to another image memory, a floppy disk, a compact disk, a hard disk or a digital video disc or digital versatile disc (DVD) that are not illustrated in FIG. 2.

One example of not using the image memory 11 is to copy a single original document for only once. In this case, the scanned image data is outputted to the image forming unit 400 without storing it in the image memory 11. When the image memory 11 is not used, the scanner unit 200 performs an image process for converting the intensity data from charge-coupled devices (CCD) to the area gradation data at an internal image processing unit (IPU). The converted area gradation signal after the image process is outputted to the image forming unit 400 and is given to the wiring control via the internal image memory in the digital copier 1000. The writing control in the digital copier 1000 performs a pulse control for reproducing a dot or a post-dot placement process over the image forming unit 400. After the image data is stored in the memory unit 11, when additional processes such as image rotation or image composition are performed upon reading the stored image data, the system controller 10 controls the access of the memory 11, converts the image data to printer data for the host PCa and compresses or decompresses the image data for the efficient use of the memory. The printer data conversion includes a conversion between the character code and the character bit. After the image data is compressed in the image memory 11, the compressed image data is stored and is read out as necessary. The read compressed data is decompressed in the image memory 11 to the original image data, and the decompressed image data is outputted to the digital copier 1000 via the PCI bus 12.

In the above described data flow, the multi-functions in the digital color copier 1000 are implemented by the data transfer on the PCI bus 12 due to the bus control by the system controller 10. One of the multi-functions, the FAX function transfers the scanned image data from the scanner unit 700 to the facsimile board FXB via the PCI bus 12. Based upon the control of the bus control function, the system controller 10 determines the priority use right of the PCI bus 12 among the scanner unit 200, the image forming unit 400, the image memory 11 and the facsimile board FXB for the jobs including a copy function, a facsimile transmission/receipt function and a print output function.

Figure 3:
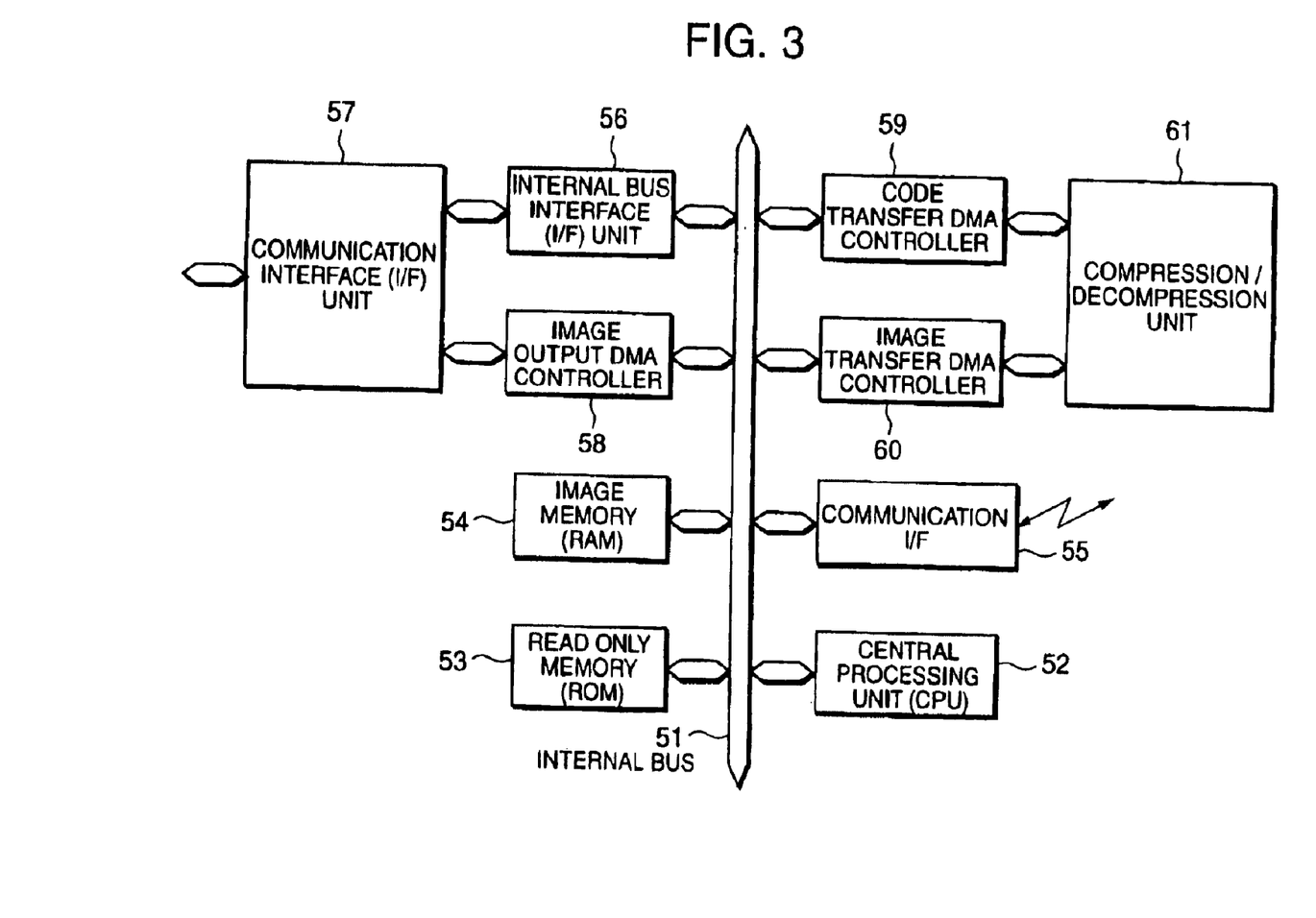
FIG. 3 is a block diagram illustrating components of one preferred embodiment of the system controller 10 according to the current invention.

Now referring to FIG. 3, a block diagram illustrates components of one preferred embodiment of the system controller 10 according to the current invention. The system controller 10 further includes a microcomputer that is connected to a central processing unit (CPU) 52, a read only memory (ROM) 53, an image memory 54 and a communication interface (I/F) unit 57 via an internal bus 51. The internal bus 51 via an internal bus interface (I/F) unit 56 and a PCI interface (I/F) unit 57 connects the system controller 10 to the PCI bus 12. Furthermore, the system controller 10 includes an image output DAM controller 58 that is connected to the PCI I/F unit 57, a code transfer DMA controller 59 and an image transfer DMA controller 60. The image output DAM controller 58, the code transfer DMA controller 59 and the image transfer DMA controller 60 are connected to the CPU 52 and the image memory 54 via the internal bus 51. Additionally, the system controller 10 further includes a compression/decompression unit 61, which is connected to the code transfer DMA controller 59 and the image transfer DMA controller 60.

Still referring to FIG. 3, the CPU 52 performs various calculations, sets all of the parameters for the entire system and activates the above DMA controllers 58, 59 and 60. When the CPU 52 receives the image data from the host PCa, the CPU 52 renders the image in the image memory 54 based upon a printer language. During the rendering of the image data, the image is rendered by dividing one page into a number of bands. The ROM 53 stores an operation control program primarily for the CPU 52. For example, the ROM 53 is made of involatile memory units. In addition to an image storage function, the image memory 54 is also used as a temporary storage for various data and the calculation results from the CPU 52. For example, the image memory 54 is made of semiconductor memory units such as DRAM. The communication I/F 55 is an interface among the host PCa, the operation board OPB, the facsimile board PBX and the system controller 10 of FIG. 2, and the received data is communicated to the CPU 52 via the image memory unit 11 or the internal register. The internal bus I/F unit 56 is interfaced between the PC I/F unit 57 and the internal bus 51. The internal bus I/F unit 56 receives the address and data as specified by a PCI bus master and outputs them to the image memory 54. The PCI I/F unit 57 performs the data transfer with the PCI bus master according to the PCI bus protocol.

The image output DMA controller 58 functions as a second DMA controller. That is, the image output DMA controller 58 is activated by the CPU 52 and reads the image data from a specified area in the image memory 54. By the handshake, the image output DMA controller 58 sequentially outputs the above image data to the PCI I/F unit 57. The PCI bus master directly accesses the image memory 54, which is connected via the internal bus I/F unit 56 in the system controller 10 during normal access. In this case, a predetermined address in the memory space is accessed in the image memory 54, which has been previously specified by the PCI configuration parameter. The above specification shortens the response time of the PCI for outputting to the image forming unit 400.

The code transfer DMA controller 59 is activated by the CPU 52. During the image data compression, the code transfer DMA controller 59 receives the compressed code data that is outputted from the compression/decompression unit 61 and writes the compressed code data in the specified area in the image memory 54. During the image data decompression, the code transfer DMA controller 59 reads the compressed code data from the specified area of the image memory 54 and outputs it to the compression/decompression unit 61. Since the code transfer DMA controller 59 keeps track of the code data amount from the compression/decompression unit 61 during the image data compression, the CPU 52 obtains the code data amount value via the internal register upon completion of the compression.

The image transfer DMA controller 60 functions as a first DMA controller. That is, the image transfer DMA controller 60 is activated by the CPU 52. During the image data compression, the image transfer DMA controller 60 reads the image data from the specified area in the image memory 54 and outputs it to the compression/decompression unit 61. Furthermore, during the image data decompression, the image transfer DMA controller 60 receives the compressed code data that is outputted from the compression/decompression unit 61 and writes the image data in the specified area in the image memory 54.

During the data compression, the compression/decompression unit 61 compresses the image data from the image transfer DMA controller 60 and outputs the compressed image data to the code transfer DMA controller 59. At the end of compression, the compression/decompression unit 61 outputs a compression complete signal and reports to the code transfer DMA controller 59. On the other hand, during decompression, the compression/decompression unit 61 decompresses the coded data from the code transfer DMA controller 59 and outputs the image data to the image transfer DMA controller 60. In a preferred embodiment, the MH coding method is utilized.

The Image Processing Operation by the DMA Controllers
1. Summary

The image processing operation by the DMA controllers 58, 59 and 60 will be summarily described. In the following operational summary, the image transfer DMA controller 60 is referred to as a first DMA controller while the image output DMA controller 58 is referred to as a second DMA controller. The first DMA controller 60 and the second DMA controller 58 operate in parallel. While the first DMA controller 60 writes image data blocks in the image memory 54, the second DMA controller 58 transfers the image data blocks that have been transferred by the first DMA controller 60 and have been already expanded in the image memory to the outside for the direct memory access. That is, the image data is divided into a plurality of blocks. After one block A of the image data is written in an area in the image memory 54 by using the first DMA controller 60, another block B that is subsequent to the block A is also written in another area in the image memory 54. The second DMA controller 58 transfers the block A of the image data to the outside while the first DMA controller 60 is writing the block B of the image data in the image memory 54. Subsequently, assuming that the memory area in the image memory 54 is divided into two areas, the first DMA controller 60 writes yet another block C of the image data that follows the block B in the area of the image memory 54 where the block A of the image data had been written. The DMA transfer operation of the first DMA controller 60 must be after the second DMA controller 58 finishes the DMA transfer of the block A of the image data.

In the preferred embodiment, a pause bit is noted for indicative of temporarily halting the DMA transfer after a block of the image data is written in an area in the image memory 54 based upon the descriptor information that the first DMA controller 60 has read. By the above pause bit, the first DMA controller 60 temporarily stops the DMA transfer after writing the block B of the image data and places itself in a predetermined halt or waiting state. The second DMA controller 58 instructs the resumption of the DMA transfer to the halted first DMA controller 60 after completing the DMA transfer of the block A of the image data in the image memory 54 to the outside. By the above described control, the management is performed without the use of software for the two DMA controllers 58 and 60 as well as the DMA controller 60 to timely toggle the processes to access the image memory 54.

2. Detail

Figure 4:
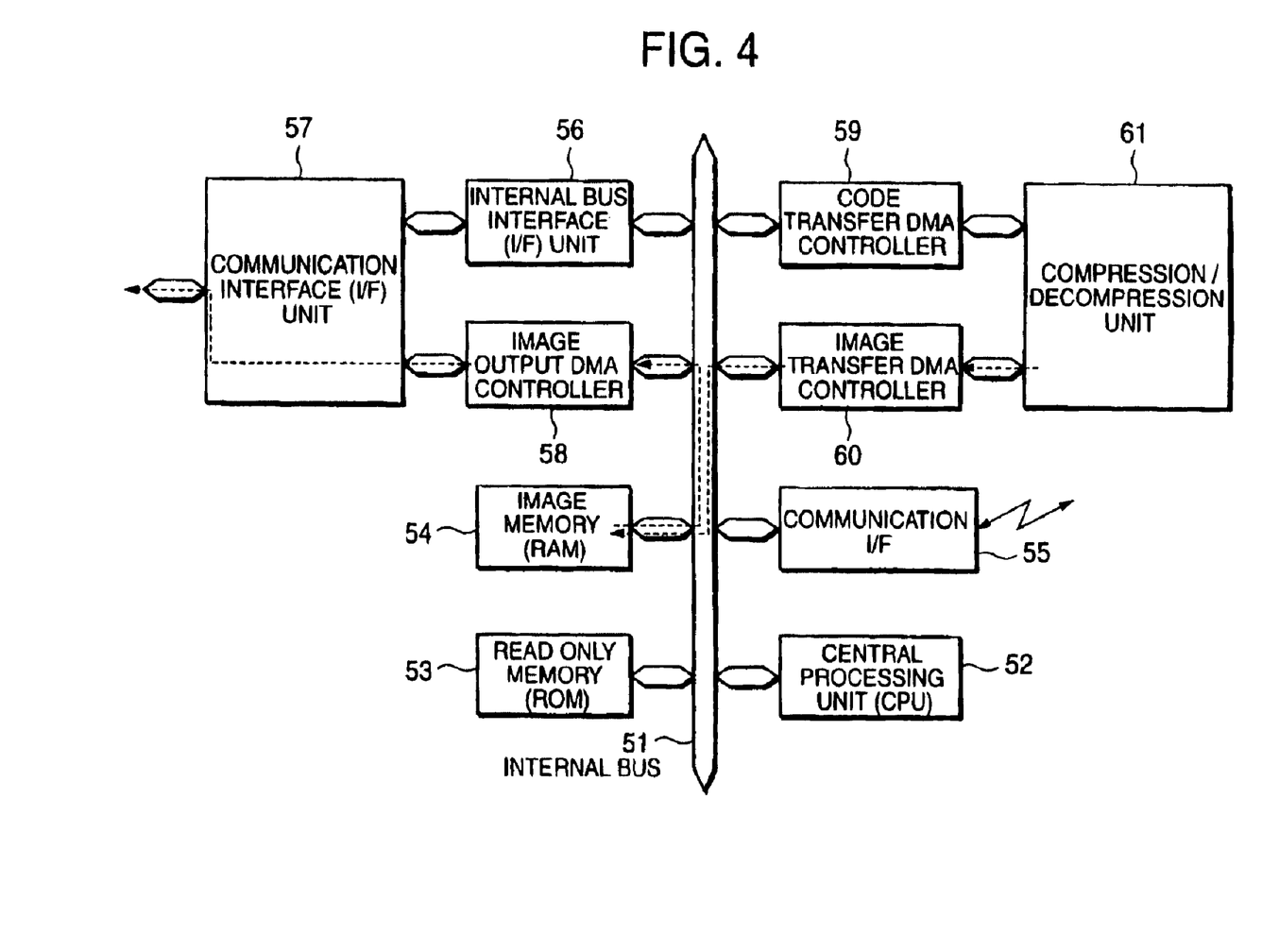
FIG. 4 is a block diagram illustrating a path in which the image data is transferred for printing among the components of one preferred embodiment of the system controller 10 according to the current invention.

Now referring to FIG. 4, a block diagram illustrates a path in which the image data is transferred for printing among the components of one preferred embodiment of the system controller 10 according to the current invention. The above transfer path is indicated by dotted lines. The image processing operation by the DMA controllers 58, 59 and 60 will be described in detail. When the CPU 52 receives the image data from the host PCa, the CPU 52 renders the image in the image memory 54 based upon a printer language. During the rendering of the image data, the image is rendered by dividing one page into a number of bands. To save memory after rendering, the compression is performed base upon the band, and the image data is temporarily stored as the code data in the memory. Although the compression is accomplished by software in an alternative embodiment, the preferred embodiment utilizes hardware compression based upon the DMA controllers 59, 60 and the compression/decompression unit 61. During the printing process, the code or sign of the compressed plural bands is read at a time from the image memory 54 by the code transfer DMA controller 59 and is decoded or decompressed in the image memory 54. The image transfer DMA controller 58 reads the image data in the image memory 54 and transfers it to the PCI I/F unit 57. The image forming unit 400 on the PCI bus becomes a bus master, and the image data is printed.

Figure 5:
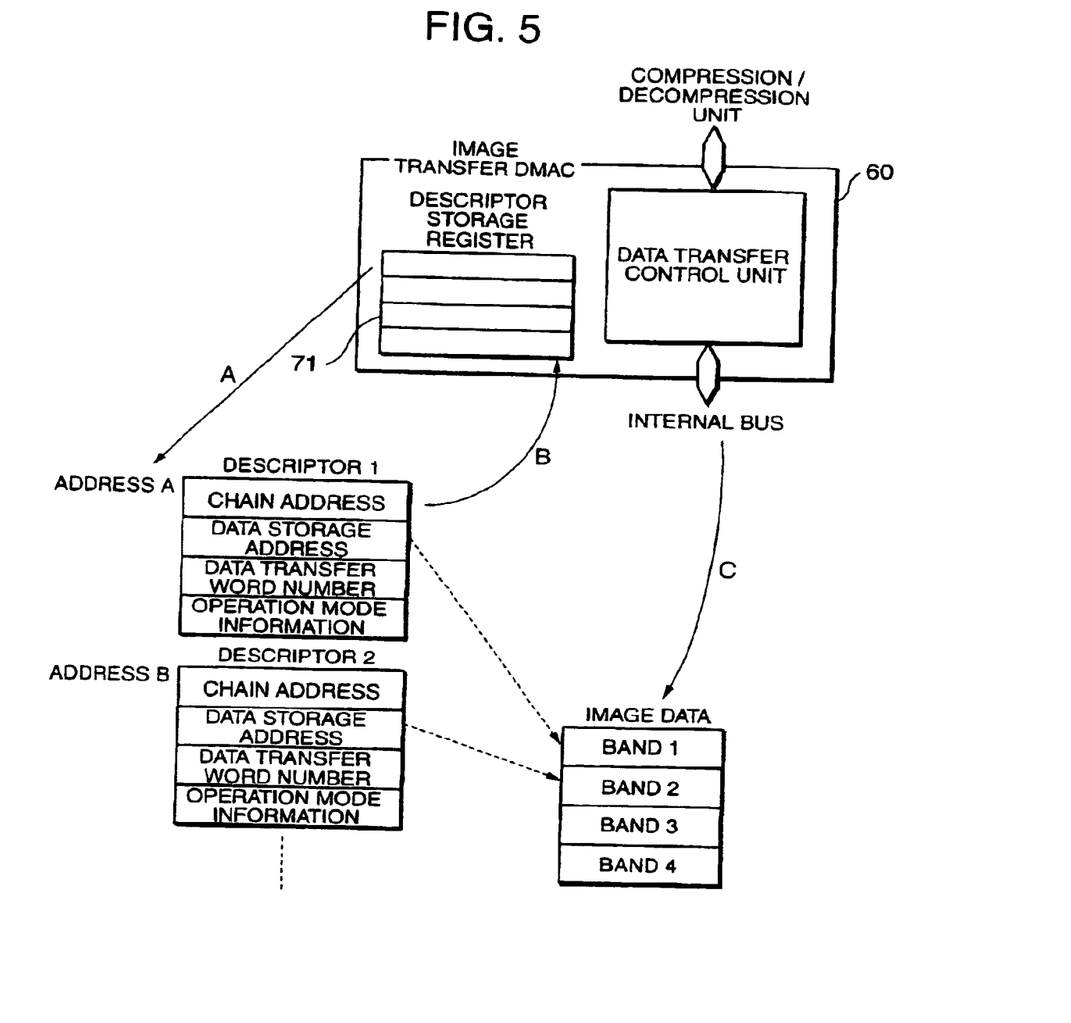
FIG. 5 is a block diagram illustrating a descriptor access operation and a data transfer operation by the image transfer DMA controller 60 according to the current invention.

Now referring to FIG. 5, a block diagram illustrates a descriptor access operation and a data transfer operation by the image transfer DMA controller 60 according to the current invention. The image data is divided into four bands before it is compressed. Four bands make up one page of the image data. A series of operations performs data transfer by the image transfer DMA controller 60 using the descriptor. The image transfer DMA controller 60 is activated upon receiving a decompression command and has a read access to a descriptor 1 at a chain address that is specified by the CPU 52 as specified by a line A. The descriptor information of the descriptor 1 is loaded into a descriptor storage register 71. The loaded information is made up of four words including a chain address for a storage address of a next descriptor, a data transfer address indicating a start address for data transfer, a data transfer word number for indicating a data transfer amount in a number of words and operation mode information indicative of a transfer operation mode. The least significant bit in the operation mode information is a bit for a pause state to indicate whether or not to be paused before a next descriptor is loaded after the band transfer is completed. The value of 1 indicates a pause or halt while the value of 0 indicates continuation. When one page has four bands, the least significant bit of the operation mode information in the descriptors 1 through 4 is respectively 0, 1, 1 and 1. That is, the image transfer DMA controller 60 is in the halt state after two bands are transferred and waits for a resume instruction for the DMA transfer. The four sets of the descriptor information have a common data storage address between the descriptors 1 and 3 as well as between the descriptors 2 and 4. That is, the physical address is the same, and as the descriptor information is chained, the descriptor is alternately processed. For the image output DMA controller 58, the structure of the descriptor information is the same as that for the image transfer DMA controller 60, and only the data transfer direction is different. However, the image output DMA controller 58 does not utilize a pause function. For this reason, the least significant bit of the operation mode information in the descriptors has a value of 0 for every band Since the image data that is read by the image output DMA controller 58 and is outputted to the PCI is the same as the image data that the image transfer DMA controller 60 outputs to the image memory 54, the structure of the descriptor information is the same except for the operation mode information. The reading speed of the image output DMA controller 58 is determined by the printing speed of the image forming unit 400 assuming that the processing speed of the image transfer DMA controller 60 is faster than the reading speed of the image output DMA controller 58.

The Operation

Figure 6:
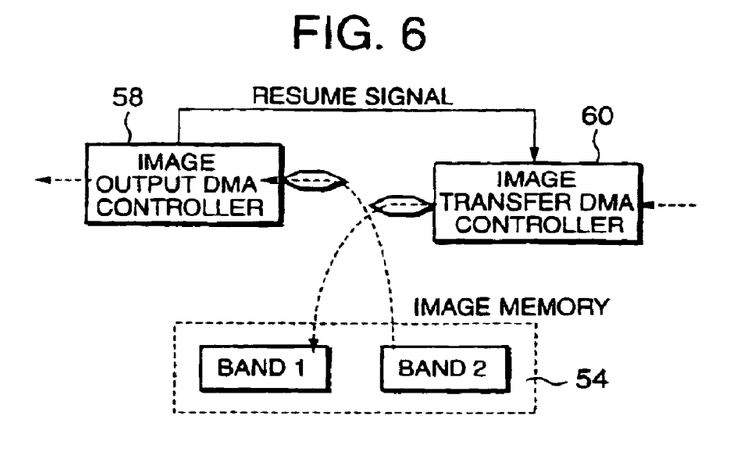
FIG. 6 is a diagram illustrating that the image output DMA controller 58 starts reading the second band.
Figure 7:
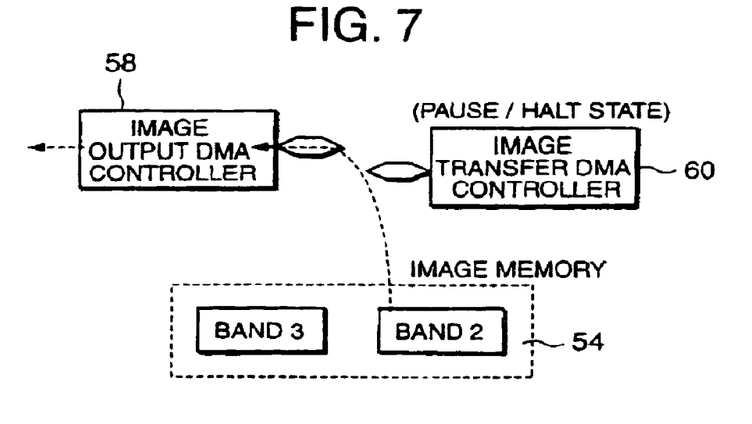
FIG. 7 is a diagram illustrating that the image transfer DMA controller 60 enters into a pause state.
Figure 8:
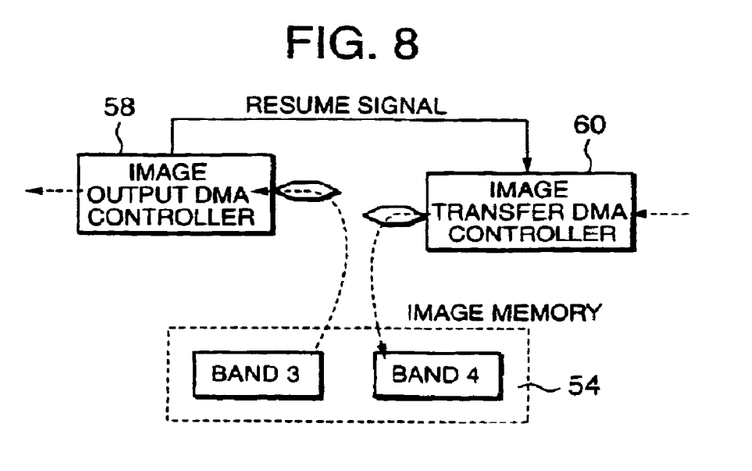
FIG. 8 is a diagram illustrating that the image transfer DMA controller 60 resumes the transfer of the image data from the fourth band and the image output DMA controller 58 starts reading of the third band.

The image transfer DMA controller 60 transfers 2-band of the image data in a pause state. After the image output DMA controller 58 completes the first band of the image data and but before the image output DMA controller 58 makes access to a next descriptor information, the image transfer DMA controller 60 resumes the transfer in response to a resume signal that is outputted from the image output DMA controller 58. The image transfer DMA controller 60 starts the third band after the resumption of the image transfer. At the same time, the image output DMA controller 58 starts reading the second band as shown in FIG. 6. Subsequently, the processing speed of the image transfer DMA controller 60 for processing the third band is faster than the reading speed of the image output DMA controller 58 and enters into a pause state as shown in FIG. 7. After the image output DMA controller 58 completes the next two bands but before accesses the next descriptor, the image transfer DMA controller 60 resumes the transfer in response to the resume signal from the image output DMA controller 58. That is, it is a chain timing of the descriptor information. The image transfer DMA controller 60 after resuming the transfer starts the fourth band operation, and the image output DMA controller 58 starts reading of the third band as shown in FIG. 8. As described above, in the preferred embodiment of the current invention, the DMA transfer process of two DMA controllers including the image output DMA controller 58 and the image transfer DMA controller 60 is alternately toggled. By the above technique, no software is necessary to perform the DMA transfer of one page of the image data. The resume signal from the image output DMA controller 58 to the image transfer DMA controller 60 is for example the two least significant bits of the operation mode information in the descriptor information that the image output DMA controller 58 should refer to indicate whether or not the DMA transfer should be resumed by the image transfer DMA controller 60. In the above example, the two least significant bits in the descriptor information that the image output DMA controller 58 should refer to are both set to a value of one.

In the above case, when the second and fourth bands are made of the divided memory area, the second and fourth bands as indicated in the descriptor is further divided descriptors 2-1, 2-2, 4-1 and 4-2. The pause bit in the image transfer DMA controller 60 is set to the value of 0 in the descriptors 2-1 and 4-1 while that of the descriptors 2-2 and 4-2 is set to the value of 1. When one band is further divided into two for saving memory, one band is made up of a plurality of descriptors in combination with the pause bit of the image transfer DMA controller 60.

When the image data is outputted to the image forming unit 400 after it is rotated 180 degrees, the image transfer DMA controller 60 processes the last data from the band and makes the image output DMA controller 58 to read from the reverse address order in the image memory so that the image is reversed. In the above process, an alternative embodiment requires no software and uses the toggling function.

In the preferred embodiment, the resumption of the DMA transfer from the pause state of the image transfer DMA controller 60 is implemented by the instruction from the image output DMA controller 58. In an alternative embodiment, a selection is made for the DMA transfer resumption mechanism between the prior art software and the above described instruction from the image output DMA controller 58.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A direct memory access (DMA) controller system for processing image data, comprising:

an external memory having a descriptor area for storing descriptor information;

an image memory to store the image data having at least two areas;

a first DMA controller connected to said external memory and said image memory for reading first descriptor information and for transferring blocks of the image data via DMA transfer alternately to one of the at least two areas of said image memory for processing according to the first descriptor information, the first descriptor information including a pause bit indicative of a halt state for said first DMA controller to temporarily halt the DMA transfer after said first DMA controller writes the block of the image data in one of the at least two areas; and a second DMA controller connected to said external memory and said image memory for reading second descriptor information and for transferring to a predetermined outside unit the blocks of the processed image data that said first DMA controller had already transferred in at least the two areas of said image memory according to the second descriptor information concurrently with said first DMA controller transferring other blocks of the image data in said image memory, said second DMA controller directly indicating to said first DMA controller in the halt state to resume the DMA transfer via a resume instruction.

2. The direct memory access (DMA) controller system according to claim 1 wherein the resume instruction is based upon timing of chain of the second descriptor information as said second DMA controller transfers to the predetermined outside unit the blocks of the processed image data.

3. The direct memory access (DMA) controller system according to claim 1 wherein to the second descriptor information includes a resume bit indicative of the resume instruction for the DMA transfer by said first DMA controller, the resume instruction being based upon the resume bit.

4. A method of controlling a plurality of direct memory access controllers, comprising the steps of:

reading first descriptor information including a pause bit indicative of a halt state at a first DMA controller;

writing blocks of the image data via DMA transfer by the first DMA controller alternately to one of at least two areas of image memory according to the first descriptor information;

temporarily halting the DMA transfer of the first DMA controller based upon the pause bit after the first DMA controller writes the block of the image data in one of the at least two areas;

reading second descriptor information at a second DMA controller;

concurrently transferring by the second DMA controller to a predetermined outside unit the blocks of the processed image data that the first DMA controller had already written in at least the two areas of the image memory according to the second descriptor information while the first DMA controller writes other blocks of the image data in the image memory; and directly indicating to the first DMA controller in the halt state to resume the DMA transfer via a resume instruction in a resume bit in the second description information from the second DMA controller.

5. The method of controlling a plurality of direct memory access controllers according to claim 4 wherein the resume instruction is based upon timing of chain of the second descriptor information as the second DMA controller transfers to the predetermined outside unit the blocks of the processed image data.

* * * * *